United States Patent

Dannels

[11] 4,020,033
[45] Apr. 26, 1977

[54] POLYTHIOETHER SEALANT COMPOSITIONS

[75] Inventor: Bobby F. Dannels, Grand Island, N.Y.

[73] Assignee: Hooker Chemicals & Plastics Corporation, Niagara Falls, N.Y.

[22] Filed: June 2, 1975

[21] Appl. No.: 582,959

Related U.S. Application Data

[63] Continuation-in-part of Ser. No. 501,716, Aug. 29, 1974, abandoned.

[52] U.S. Cl. .................. 260/31.8 Z; 260/31.2 R; 260/31.8 G; 260/37 R; 260/79; 260/79.1
[51] Int. Cl.² ......................................... C08K 5/09
[58] Field of Search ............ 260/79, 79.1, 31.2 R, 260/31.8 Z, 31.8 G, 37 R

[56] References Cited

UNITED STATES PATENTS

| | | | |
|---|---|---|---|
| 3,328,451 | 6/1967 | Bulbenko | 260/79.1 |
| 3,592,798 | 7/1971 | Oswald | 260/79 |
| 3,625,925 | 12/1971 | Oswald | 260/79 |
| 3,629,206 | 12/1971 | Stephenson et al. | 260/79 |
| 3,637,574 | 1/1972 | Millen | 260/79 |
| 3,640,923 | 2/1972 | Guthrie | 260/79.5 R |
| 3,717,618 | 2/1973 | Oswald | 260/79 |
| 3,859,360 | 1/1975 | Oswald | 260/79 |

*Primary Examiner*—Melvyn I. Marquis
*Attorney, Agent, or Firm*—Peter F. Casella; James F. Mudd; David A. Stein

[57] ABSTRACT

A sealant system comprising as a first component a mercaptan-terminated polythioether of the formula $$HS[(RS)_nR'S]_m(RS)_nH$$

where R is propylene or trimethylene or mixtures thereof, $R^1$ may be propylene or mixture of propylene and a substituted cyclohexane radical of the formula

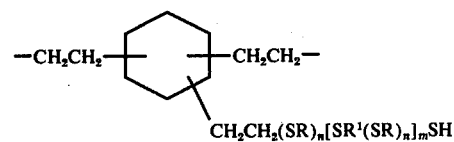

wherein the substituted cyclohexane radical is present at about 0.1 to about 3 mole percent of the total moles of R, $n$ is 1 to about 10 and $m$ is 1 to about 200; a filler such as calcium carbonate; a plasticizer selected from the group consisting of chlorinated methylstearate or a phthalate ester or mixtures thereof; an adhesion additive selected from gamma-mercaptopropyltrimethoxysilane and gamma-glycidoxypropyltrimethoxysilane; and a cure accelerator, selected from the group, tetraethylthiuram disulfide, tetramethylthiuram disulfide, para-quinone dioxime, and tri(dimethylamino)phenol and mixtures thereof, and as a second component, manganese dioxide or lead dioxide.

18 Claims, No Drawings

POLYTHIOETHER SEALANT COMPOSITIONS

CROSS REFERENCE TO RELATED APPLICATION

This application is a continuation-in-part of the U.S. application of Bobby F. Dannels, Ser. No. 501,716 filed August 29, 1974 and now abandoned.

BACKGROUND OF THE INVENTION

New sealant compositions based on mercaptan-terminated polythioether polymer are provided. These compositions contain a unique combination of ingredients which was developed to utilize the inherent qualities of the polythioether polymer. The concept of using a polythioether polymer as the base polymer of a sealant has been published. For example, in U.S. Pat. No. 3,717,618 a mixture composed of a polythioetherdithiol, a plasticizer, a stearic acid, carbon black and lead dioxide becomes cured after storage in a controlled environment. The properties of the curred composition were not described. This patent indicated the polymerizability of a mercaptan terminated polythioether in the presence of compounding ingredients. However, considerable additional information is needed to prepare a practical, commercially-useful sealant having adequate work life and suitable curing time, hardness and good adhesive properties.

The properties of a sealant are dependent not only on the inherent contribution of the base polymer but also on the overall effect of the combination of ingredients making up the formulated sealant. As a result of my unique formulations, polythioether polymers can now be readily utilized as the reactive polymeric component of sealants which will meet the critical demands of sealant users. My novel formulations provide the means whereby polythioetherthiols can now be components of sealants meeting the real-life requirements of economics, and performance. These formulations both in the cured and uncured state are new compositions which are the vehicles whereby the superior inherent properties of the polythioetherthiols can be realized and utilized!

Elastomeric sealants find use in filling, binding and sealing joints and seams in many areas of construction including buildings and building components such as insulated glass windows, marine, aircraft and pavements.

These sealants are generally mixtures of a base polymer, a curing agent and several compounding ingredients. The compounding ingredients serve many purposes. They lower cost, provide thixotrophic properties and plasticization, improve adhesion, affect color, accelerate or retard cure and improve weatherability. A host of curing agents are employed.

Sealants derived from mercaptan-terminated base polymers are usually cured by oxidative coupling, although other systems utilizing epoxy compounds or isocyanates or other types of reagents are also useful. Organic or inorganic peroxides are generally employed to effect oxidative coupling of mercaptan-terminated polymer. Agents such as oxygen or sulfur are also effective. Manganese peroxide, calcium peroxide and lead peroxide are inorganic peroxides commonly used as oxidative curing agents. The technique in which they are compounded into the sealant formulation and other factors such as pH, particle size of the peroxide, the presence or absence of accelerating or retarding chemicals, relative humidity, and temperature affect the rate and extent of cure, and hence the useful properties of the sealant in the field.

The compounding ingredients are often interactive with each other, with the curing agents and with the base polymer. Sealant characteristics are often unpredictably affected by these interactions. Thus, for example, a plasticizer may lessen the highly desirable level of adhesion of the sealant to a concrete substrate or an adhesion additive may reduce the storage stability of the packaged sealant. The introduction of a new compounding ingredient or curing agent into a sealant formulation generally entails the adjustment of the other parameters of the system in order to retain the already realized valuable properties of the sealant as well to gain improved properties.

A major component of sealants is the base polymer. Its fundamental structure and hence its reactivity, stability, viscosity and other properties are of utmost importance in ultimately defining the performance of the sealant. Its properties with respect to its interaction with the curing agent and compounding ingredients are of major importance. One would expect, therefore, to see differences, when the mercaptan-terminated base polymer is replaced with a different mercaptan-terminated base polymer. These differences, seen as sealant physical properties, and curing and handling characteristics, would be due to the contribution of fundamental properties of the new polymer and also due to the interaction of the new polymer, in terms of compatability, reactivty, and other factors, with the compounding ingredients.

The differences in properties between sealants derived from different base polymers are not entirely obvious and are often unexpected. Employing a new base polymer will probably require the selection of new compounding ingredients in order to realize the full contribution of the new polymer to sealant properties. A new degree of uncertainty is introduced. The interaction of compounding ingredients is overlaid on the new set of characteristics of the new base polymer. Therefore, considerable insight is necessary to develop a sealant suitable for use in the field based on a new base polymer.

Many sealant formulations based on mercaptan-terminated polymers utilize the polysulfide liquid polymers of the type sold under the trade name "Thiokol". A body of knowledge concerning the application of standard or well-known compounding ingredients in sealant formulations has been built up during the last 20-30 years and much or most of this work has been directed toward formulations containing Thiokol polysulfide polymers.

Several prior art patents illustrate the state of the art, but as discussed below, the teachings of these references are distinguished from the present invention.

Oswald et al, U.S. Pat. No. 3,625,925 discloses a process for the preparation of polythioether products and suggests the use of such products in adhesive compositions, in admixture with various fillers, such as carbon black, oxidizers such as lead dioxide, calcium perioxide, and zinc peroxide, plasticizer such as dibutylphthalate and stearic acid as a cure retarder. The essential detail necessary to provide a useful sealant is not provided. Useful formulations based on necessary cure accelerators and adhesion additives and the interaction of specific constituents are neither disclosed nor suggested.

Oswald, U.S. Pat. No. 3,592,798 discloses a process for the preparation of certain low mol. wt. polythioether addition products and suggests the reaction of such products with reactants such as diisocyanates, epoxides, and others to form mastic compositions. Sealant systems based on oxidative curing agents such as $MnO_2$ or $PbO_2$ as in the present invention are not disclosed.

Stephenson et al, U.S. Pat. No. 3,629,206 discloses curing systems based on lead salts and alkylthiuram polysulfides, e.g., tetramethylthiuram disulfide, for use with organic polysulfide (i.e. "Thiokol" type) polymers. Neither the sealant systems nor the polythioethers of the present invention are suggested.

Millen, U.S. Pat. No. 3,637,574 discloses sealant compositions based on polysulfide polymers (not the polythioethers of the present application) cured with the aid of a zinc compound and a tetraalkylthiuram disulfide. The base polymer as well as the other critical sealant constituents differ substantially from those of the present sealant system.

Guthrie, U.S. Pat. No. 3,640,923 discloses curable adhesive compositions formed by adding an oxime such as quinone dioxime to a liquid composition comprising a polyene and a polythiol in the presence of an iron or iron compound to accelerate the cure. The dioxime is added to a system wherein not only the base polymer but the various other constituents of the system differ considerably from those of the present sealant system.

Bulbenko, U.S. Pat. No. 3,328,451 discloses the use of mercaptoalkyl amino alkylalkoxy silane compounds as adhesive additives in polysulfide polymer based systems. Sealant systems based on the polythioethers employed in the present compositions are not disclosed.

Oswald et al, U.S. Pat. No. 3,859,360 relates to thioether mastic and pesticide compositions prepared from the products of free radical addition of monothiols or dithiols to diallylic sulfides. The reference compositions are distinguished from those of the present invention in being devoid of recurring propylene groups as integral units of a thioether polymer chain and any trivalent substituted cyclohexane groups.

SUMMARY OF THE INVENTION

The present invention deals with sealants derived from a mercaptan-terminated base polymer different than Thiokol polymer. Idealized structures of the two polymers are shown:

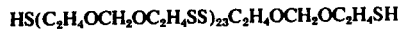

Thiokol

Polythioether where R is propylene or trimethylene or mixtures thereof and $R^1$ is propylene or a mixture of propylene and a substituted cyclohexane radical of the formula

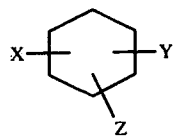

wherein X, Y and Z are substituents attached to different carbon atoms of the cyclohexane ring and two of X, Y and Z are $-CH_2CH_2-$ and one of X, Y and Z is $-CH_2CH_2(SR)_n[SR^1(SR)_n]_mSH$, said substituted cyclohexane radical being present at about 0.1 to about 3 mole percent of the total moles of R; $n$ is about 1 to about 10, preferably abut 1 to about 3 and $m$ is 1 to about 200, preferably about 15 to about 40. (In the foregoing definition of the polythioether of the invention the term propylene signifies the group $-CH(CH_3)CH_2-$ and the term trimethylene signifies the group $-CH_2CH_2CH_2-$). The average molecular weight of the Thiokol polymer is about 4000 as described, for example, in U.S. pat. No. 3,637,574. The molecular weight of the components of the polythioether polymer useful in sealants can range from 256 to about 40,000. The preferred average molecular weight for sealant applications is about 2000 to 6000. Both polymers have a level of trifunctionality which is introduced during their manufacture, i.e., from about 0.2% to about 3% to insure a level of cross-linking in the cured polymer to provide good physical properties. The differences between the molecular structures of the two polymers are significant. The polysulfide structure contains disulfide bonds and formal linkages. Sulfur is present in the polythioether chain only as monosulfide bonds, while the remaining portion of the chain is hydrocarbon.

One would expect the structural features of the two base polymers to differently affect compatibility with the formulation systems and reactivity with curing agents. In addition, reactivity to curing agents of the two polymers will be influenced differently by the various compounding ingredients and by factors such as pH and humidity. One skilled in the art would have to resort to considerable creative experimentation to develop a practical sealant based on the polythioether polymer.

The polythioethers employed in the sealant compositions of this invention may be prepared, for example, by the photochemically initiated reaction of propane dithiol and a trifunctional organic compound with an acetylenic compound. A crude propane dithiol, suitable for use in the preparation of the polythioethers of the present invention may be prepared by the reaction of allene and hydrogen sulfide. The crude product of this reaction is predominently 1,3-propane dithiol with lesser amounts of 1,2 propane dithiol and various minor amounts of oligimers formed in the reaction. The preparation of these polythioethers is disclosed in detail in my copending application Ser. No. 535,632 filed Dec. 23, 1974, the disclosure of which is incorporated herein by reference.

In the Examples A through C which follow, the polythioethers disclosed are prepared as follows:

EXAMPLE A

The following reactants are charged into a reaction vessel:

106 parts by weight of propane dithiol (slightly less than one mole) (predominently 1,3 propane dithiol with minor amounts, such as less than about 35% of 1,2 propane dithiol)

0.8 parts by weight of 1,2,4-trivinyl cyclohexane (0.005 moles)

0.1 parts by weight of benzaldehyde (a photosensitizer)

The reaction vessel is then flushed with nitrogen to remove oxygen and the contents were illuminated with ultraviolet light from medium pressure mercury u.v.

lamp for a period of 30 minutes. The ultraviolet irradiation is continued while 39 parts of methyl acetylene (slightly less than one mole) was introduced slowly — at a rate just sufficient to maintain a mixture saturated with the methyl acetylene — until the viscosity of the mixture reached about 400 poise. The ultraviolet irradiation is continued for an additional ½ hour. The polythioether thus prepared is characterized by the formula

where R is propylene or trimethylene or mixtures thereof, $R^1$ is propylene or a mixture of propylene and a 1,2,4-substituted cyclohexane radical of the formula

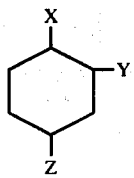

wherein X, Y and Z have the above defined meanings and the 1,2,4-substituted cyclohexane radical is present at about 0.1 to about 3 mole percent of the total moles of R, $n$ is 1 to about 10 and $m$ is 1 to 200. As denoted by the foregoing structural formula the 1,2,4-substituted cyclohexane radical may be positioned in the structure of the polymer in three different isomeric modes in view of the unsymetrical substitution of the groups X, Y and Z in the cyclohexane nucleus.

Variations within the above formula may be effected by varying the proportion and nature of reactants. For example, the trifunctionality of the polythioether may be controlled as a function of the moles of trivinylcyclohexane employed. The proportions of trimethylene and propylene in the R moiety are a function of the ratio of 1,3 isomer to 1,2 of propane dithiol. The two isomers may be separated, for example, by distillation, and either may be employed or they may be employed as a mixture in any desired proportion. If pure 1,2-propane dithiol is employed, R will be propylene, whereas if pure 1,3-propane dithiol is employed R will be trimethylene. Preferred polythioethers are those wherein R is between 0 and about 35 mole percent propylene. The value of $n$ will depend on the purity of the propane dithiol prepared from the reaction of allene and $H_2S$. If a relatively pure propane dithiol, purified for example, by distillation, is employed, the value of $n$ will be about one. Higher values of $n$ are a function of the amount of oligimer present when a crude propane dithiol reaction product is employed. The value of $m$ will vary directly with the quantity of methyl acetylene, as will the molecular weight.

EXAMPLE B

The procedure of Example A above is repeated substantially as described except that 1,2,3-trivinyl cyclohexane is employed in place of the 1,2,4-trivinyl cyclohexane of Example A. The polythioether thus prepared is characterized by the formula

where R is propylene or trimethylene or mixtures thereof, $R^1$ is propylene or a mixture of propylene and a 1,2,3-substituted cyclohexane radical of the formula

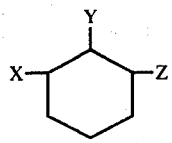

wherein X, Y and Z have the above-defined meanings and the 1,2,3-substituted cyclohexane radical is present at about 0.1 to about 3 mole percent of the total moles of R, $n$ is 1 to about 10 and $m$ is about 1 to 200.

As denoted in the foregoing structural formula the 1,2,3-substituted cyclohexane radical may be positioned in the structure of the polymer in two different isomeric modes in view of the unsymetrical substitution of the groups X, Y and Z on the cyclohexane nucleus.

EXAMPLE C

The procedure of Example A above is repeated substantially as described except that 1,3,5-trivinyl cyclohexane is employed in place of the 1,2,4-trivinyl cyclohexane of Example A. The polythioether thus prepared is characterized by the formula

where R is propylene or trimethylene or mixtures thereof, $R^1$ is propylene or a mixture of polypropylene and a 1,3,5-substituted cyclohexane radical of the formula

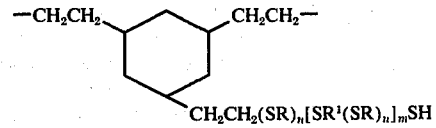

wherein the 1,3,5-substituted cyclohexane radical is present at about 0.1 to about 3 mole percent of the total moles of R, $n$ is 1 to about 10 and $m$ is about 10 to 200.

As will be appreciated by those skilled in the art the 1,3,5-substituted cyclohexane may be positioned in only one mode in the polymer in view of the symetrical positioning of the substituent groups on the cyclohexane nucleus.

DETAILED DESCRIPTION

The following Examples 1 through 7 illustrate the difference in responses of the polythioether base polymer and a polysulfide (Thiokol LP32) polymer to various compounding agents — when the polymers are a part of a sealant system.

Two sealant masterbatches were prepared, one containing the mercaptan-terminated polythioether of Example A and the other containing Thiokol LP-32 mercaptan-terminated polysulfide.

The polythioether employed is characterized by the formula of Example A wherein the 1,2,4-substituted cyclohexane radical is present at about 0.5 mole percent of the total moles of R; $n$ is about 1; $m$ is about 31; R is a mixture of about 10 mole percent propylene and about 90 mole percent trimethylene and the molecular weight is about 4700. The components of the masterbatches were premixed by hand and then thoroughly blended by three passes through a 3-roll paint mill. The compositions are shown:

| Parts | Component |
|---|---|
| | POLYSULFIDE AND POLYTHIOETHER MASTERBATCHES FOR EXAMPLES 1-7 |
| | *Resin Paste* |
| 100 | Polysulfide or polythioether |
| 50 | Precipitated calcium carbonate[4] |
| 40 | Ground calcium carbonate[5] |
| 10 | Titanium dioxide |
| 40 | Benzylphthalate plasticizer[1] |
| | *Catalyst Paste* |
| 100 | Manganese dioxide[2] |
| 100 | Butyl benzylphthalate plasticizer[3] |

[1] Monsanto Santicizer 278
[2] Type D Sold by the Diamond Shamrock Corporation
[3] Monsanto Santicizer 160
[4] Average particle size 0.06 microns
[5] Average particles size 4-24 microns The catalyst paste and the resin paste are the two parts of a two-part system. The primary constituent of the first component is the polymer, that is the polysulfide or polythioether. The primary constituent of the second component of the system (catalyst paste) is the curing agent. It is important that the two components be kept separate until shortly before use. For convenience in mixing, it is preferred though not essential, to formulate the second component as a paste by incorporating therein a portion of the plasticizer and/or filler and/or other ingredient to achieve a desirable viscosity and as an aid to rapid and thorough mixing. However, the second component may consist of the curing agent alone. In the sealant systems of the present invention, various known fillers, such as carbon black, titanium dioxide, zinc sulfide, calcium carbonate, silicon dioxide and the like may be employed preferably in amounts of between about 60 to 160 parts of filler per 100 parts of polythioether and may be incorporated in either or both components. Preferably, all or a major proportion of the filler is incorporated in the resin paste. An advantage in terms of strength is obtained in the curred sealant when a portion of the filler is of a small particle size, such as, less than about 0.2 microns. Calcium carbonate has been found to be a particularly compatible filler in the sealant systems of the present invention. Improvements in reinforcement of the cured sealant are effected when a portion of the filler is precipitated calcium carbonate, that is calcium carbonate having a particle size in the range of about 0.01 to about 0.2 microns. The preferred sealant systems of this invention are those wherein from about 40 to about 80 parts of the filler, per 100 parts of polythioether, are of a particle size of from about 0.01 to about 0.2 microns. In addition other fillers may be employed, if desired. For example, it is a convenience in the application of these sealants to employ a minor proportion such as up to about 20 parts, preferably 5–15 parts, of titanium dioxide filler per 100 parts of polythioether in one of the components. The titanium dioxide provides a distinctive white appearance which is an aid in determining the degree of mixing when the two components are combined. Other constituents of the sealant systems of this invention include 40–70 parts of plasticizer, 0.1 to 3.0 parts of an adhesion additive and 0.1 to 2.0 parts of a cure accelerator, and 5–12 parts of oxidative curing agent. The specific plasticizers, adhesion additives, cure accelerators and oxidative curing agents suitable for use with the polythioethers of the present sealant systems are discussed hereinbelow.

The sealant applicator mixes two parts shortly before use. Immediately after being combined the resulting system should begin to cure. The portion of the time after mixing when the mixture can be conveniently applied, i.e., by trowel or cartridge plunger applicator or caulking gun, that is before it becomes too viscous to apply, is designated as "work life". The time required for the applied sealant, when stored at 40° C at 60% relative humidity to become tack free and gain a Shore A hardness of 10 or more is designated, "cure time".

In Examples 1 through 7 various additives intended to act as cure accelerators were added to portions of the masterbatch resin paste. The mixtures were then mixed with catalyst paste and applied to a glass plate. The work life, cure time and the time required to reach a useful hardness were recorded. In these examples, and elsewhere in the specification and claims, the term parts refers to parts by weight.

EXAMPLE 1-7
COMPARISON OF POLYSULFIDE (PS) AND POLYTHIOETHER (PE)

Parts of Additive Added to 100 Parts of Resin Paste and 5.8 Parts of Catalyst Paste[1]

| Additive | 1 PS | 1 PE | 2 PS | 2 PE | 3 PS | 3 PE | 4 PS | 4 PE | 5 PS | 5 PE | 6 PS | 6 PE | 7 PS | 7 PE |
|---|---|---|---|---|---|---|---|---|---|---|---|---|---|---|
| Dinitrobenzene | 0.83 | 0.83 | 0.83 | 0.83 | | | | | | | | | 2.1 | 2.1 |
| Pyridine | | | | | | | 2.1 | 2.1 | | | | | | |
| Benzoic acid | | | | | | | | | 2.1 | 2.1 | | | | |
| Sodium Methylate | | | | | | | | | | | 2.1 | 2.1 | | |
| Magnesium Oxide | | | | | | | | | | | | | 1.3 | 1.3 |
| Water | | | 0.21 | 0.21 | | | | | | | | | | |
| Work Life (minutes) | 30 | >240 | 30 | >240 | 30 | >240 | 10 | 10 | >8 hrs | >8 hrs | 120 | >8 hrs | 60 | >240 |
| Cure Time (hours) | 3 | >72 | 2.5 | >72 | 5 | >72 | 3 | >72 | no cure | | 5 | 5 days | 7 | >7days |
| Shore A Hardness/after days | 38/3 | 15/20 | 35/3 | 20/20 | 37/3 | 25/20 | 34/3 | 34/20 | 0/20 | 0/20 | 30/6 | 40/20 | 42/6 | 25/20 |

[1] 2.9 parts of catalyst paste used in Example 7.

These data illustrate differences in reactivity of polysulfide based sealant and polythioether based sealant as measured by curing rates.

The basic differences in the polysulfide and the polythioether are seen in Example 3 where no additives were employed. The polysulfide based formulation (PS) cured in five hours after a satisfactory work life period of 30 minutes. It developed good hardness in 3 days. On the other hand, the polythioether based formulation did not cure in 72 hours. Its work life was over 240 minutes. It developed a hardness of only 25 after 20 days. Furthermore, the various additives which have been recommended in the prior art as useful in polysulfide based sealant systems provided little or no beneficial effect with the polythioether. Adding dinitrobenzene or dinitrobenzene and water shortened the cure time for the polysulfide formulation in Examples 1 and 2 but had no effect on the corresponding polythioether system. Although in Example 4 pyridine shortened the work life of both formulations, the cure time for the polythioether based formulation was over 72 hours and was unsatisfactory. Both systems lost cure properties when formulated with benzoic acid (Example 5). In Example 6 sodium methylate had a lesser (or no) retarding effect on the polythioether sealant than on the polysulfide sealant. Magnesium oxide has relatively little effect on both formulations of Example 7, although counteraction of the effect of dinitrobenzene on the cure time of the polysulfide sealant is seen.

In one of these examples did the polythioether based sealant approach the polysulfide sealant in the highly desirable short cure times and short time to achieve good hardness.

Examples 8 through 56 describe the invention of an insulated window glass sealant based on polythioether polymer. It will be seen that a series of problems became apparent and subsequently were solved as the development progressed. Work life and curing speed were first adjusted; adhesion and retention of adhesion was built into the system; and an alternate plasticizer was introduced.

In Example 8, below, it is shown that tri(dimethylamino)phenol and tetraethylthiuram disulfide (TETD) were effective in reducing cure time.

EXAMPLE 8

A polythioether masterbatch was prepared similar to that of Examples 1–7 except that butylbenzylphthalate was substituted for the benzylphthalate plasticizer in the resin paste and 0.21 parts each of tetraethylthiuram disulfide and tri(dimethylamino)phenol were added to the resin paste. The resin paste and catalyst paste when mixed and blended as in Examples 1–7, exhibited a work life of 30 minutes and a cure time of 3 hours, as compared with a work life of greater than 240 minutes and a cure time of greater than 72 hours in Example 3.

Although the addition of tetraethylthiuram disulfide and tri(dimethylamino)phenol as cure accelerators provided a system having satisfactory work life and cure time the composition was lacking in adhesive properties and thus unsuitable as a sealant system.

A required property of a good sealant is adhesion. The sealant must adhere to the substrates to which it is applied. For example, sealants for use in insulated glass assemblies must adhere to aluminum and glass. In addition the adhesion must be retained on prolonged immersion in water and exposure to sunlight.

In Examples 9–17 a polythioether masterbatch of the compositions shown was used. The polythioether employed is characterized by the formula hereinabove wherein the 1,2,4-substituted cyclohexane radical is present at about 0.5 mole percent of total moles of R, $n$ is about 1, $m$ is about 27, the molecular weight is about 4000, and R is about 10 mole percent propylene and about 90 mole percent trimethylene.

| Parts | Component |
|---|---|
| POLYTHIOETHER MASTERBATCH FOR EXAMPLES 9–17 | |
| | Resin Paste |
| 100 | Polythioether of Example A |
| 50 | Precipitated calcium carbonate |
| 40 | Ground calcium carbonate |
| 10 | Titanium dioxide |
| 50 | Chlorinated Methyl-stearate[1] |
| | Catalyst Paste |
| 100 | Manganese Dioxide |
| 100 | Chlorinated Methyl-stearate[1] |
| 50 | Precipitated calcium carbonate |

[1]Hooker MPS 500, Hooker Chemicals & Plastics Corp.

The cure characteristics and adhesion to glass after one week exposure to water at 60° C and ultraviolet light of sealants made up of mixtures of resin and catalyst paste, tri(dimethylamino)phenol tetraethylthiuram disulfide and various adhesive additives are described in Example 9 through 17. No or poor adhesion retention was observed.

EXAMPLE EXAMPLE 9–17

EFFECT OF ADHESION ADDITIVES ON CURE AND ADHESION 1.67 Parts of Additive, 100 Parts of Resin Paste, 6.25 Parts of Catalyst Paste, 0.125 Parts of tri(dimethylamino)phenol and 0.21 Parts of tetraethylthiuram disulfide.

| Ex. | Additive | Work Life | Cure Time[1] | Hardness[2] | Adhesion |
|---|---|---|---|---|---|
| 9 | none | 45 min. | 4 hrs. | 29 | none |
| 10 | Gamma-glycidoxypropyltrimethoxysilane[3] | 4 hrs. | no cure | 0 | poor |
| 11 | Gamma-mercaptopropyltrimethoxysilane[4] | 4 hrs. | poor cure | 2–5 | poor |
| 12 | Methylon 75108[5] | 2 hrs. | poor cure | 2–5 | none |
| 13 | Durez 10694[5] | 2 hrs. | poor cure | 2–5 | none |
| 14 | Aniline Resin | 45 min. | 4 hrs. | 20 | poor |
| 15 | Sulfur-Phenol Resin | 4 hrs. | 6 hrs. (tacky) | 0 | none |
| 16 | [7]Gamma-glycidoxypropyltrimethoxysilane | ½ hr. | poor cure | 2–5 | poor |
| 17 | [7]Gamma-mercaptopropyltrimethoxysilane | ½ hr. | poor cure | 2–5 | poor |

[1]At 40° C and 25% relative humidity
[2]Shore A hardness
[3]A-187 sold by the Union Carbide Corp.
[4]A-189 sold by the Union Carbide Corp.
[5]Modified pehnolic resin sold by the General Electric Corporation
[6]Phenolic resin sold by the Durez Division of the Hooker Chemical Corp.
[7]In Examples 16 and 17, 0.42 parts of tri(dimethylamino)phenol was employed.

Of the adhesion additives tested in Examples 9–17, the best adhesion was obtained with the addition of silanes (Examples 10, 11, 16, 17) and the aniline resin (Example 14). Although the adhesion obtained with these additives was poor, because of other ingredients of the system had not been optimized, it was significantly better than that obtained with the additives of the other examples. Further tests indicated that no improvement in adhesion could be obtained through the use of aniline resin and subsequent experiments were directed to the development of sealant systems utilizing a silane adhesion additive.

In Examples 18–23 the development of a sealant system having satisfactory adhesion and cure is illustrated. Mixtures of a resin paste and a catalyst paste similar to those used in Examples 9–17, containing tetraethylthiuram disulfide and the quantity of cure accelerating amines and the silane adhesion additives listed were prepared and tested. The polythioether employed in Examples 18–23 as well as Examples 24–29 was prepared by the process described hereinabove and characterized by the formula shown wherein the 1,2,4-substituted cyclohexane radical is present at about 0.5 mole percent of the total moles of R, n is about 2, m is about 23, R is a mixture of about 15–35 mole percent propylene, the remainder being trimethylene, and the molecular weight is about 3500. The plasticizer, chlorinate methylstearate, used in Examples 18–20 was replaced in the corresponding Examples 21–23 with the plasticizer, benzylphthalate. In these examples, especially Examples 19 and 23, outstanding sealant properties are emerging. Sealants exhibiting good adhesion and durability are seen.

EXAMPLES 18–20 and 21–23

EFFECT OF SILANES AND AMINES ON CURE AND ADHESION

Parts of Silane or Amine Added to 100 Parts Resin Paste. 6.26 Parts Catalyst Paste and 0.25 Parts Tetraethylthiuram Disulfide

| Additive | | | |
|---|---|---|---|
| Gamma-methacryloxypropyltrimethoxysilane[1] | 1.2 | | |
| Gamma-glycidoxypropyltrimethoxysilane | | 1.2 | |
| Gamma-mercaptopropyltrimethoxysilane | | | 1.2 |
| tri(dimethylamino)phenol | 0.4 | 0.4 | 0.4 |
| EXAMPLE[2] | 18 | 19 | 20 |
| Work Life (minutes) | 30 | 30 | 30 |
| Cure[3] | good | good | slow |
| Adhesion | none | good | good |
| Days to Failure[4] | — | 16 days | 8 days |
| EXAMPLE[2] | 21 | 22 | 23 |
| Work Life (hr) | ½–¾ | ½–¾ | >1 |
| Cure[3] | good | good | slow |
| Adhesion | none | poor | good |
| Days to Failure[4] | — | — | >7 days |

[1]Silane A-174 sold by Union Carbide Corporation
[2]Examples 18–20: resin paste identical to pastes used in Examples 9–17. Examples 21–23: identical resin and catalyst paste except prepared with benzylphthalate.
[3]Cure after four hours at 40° C at 60% relative humidity.
[4]Days to adhesion failure in storage in 60° C water under untraviolet light.

Examples 24 through 29 illustrate an investigation which pinpointed Example 29 as the best combination of silane and amine.

EXAMPLES 24–29

EFFECT OF SILANE CONCENTRATION ON PERFORMANCE

100 Parts of Resin paste, 6.26 Parts of Catalyst Paste — Both Pastes Prepared as in Example 9–17 except in place of the chlorinated methyl stearate plasticizer, there was substituted an equal amount of benzylphthalate Plasticizer and, in addition, 4.0 Parts of tetraethylthiuram disulfide and the Following Parts of Additive.

| Additive | \multicolumn{6}{c}{Example} | | | | | |
|---|---|---|---|---|---|---|
| | 24 | 25 | 26 | 27 | 28 | 29 |
| Gamma-mercaptopropyltrimethoxysilane | 1.2 | 0.8 | 0.40 | 1.2 | 0.8 | 0.40 |
| Diethanolamine | 0.41 | 0.41 | 0.41 | | | |
| tri(dimethylamino)phenol | | | | 0.41 | 0.41 | 0.41 |
| Work Life (minutes) | 50 | 45 | 45 | 45 | 35 | 35 |
| Cure (40° C., 60% RH) | good | good | good | soft | soft | good |
| Days to Adhesion Failure | 2 | 2 | 2 | 8 | 8 | 8 |

In order to increase the rate of cure a search for curve accelerators was carried out. Para quinone dioxime was found to be useful reagent. Data illustrating the revelation of para quinone dioxime as an accelerator in the polythioether sealant system is shown in Examples 30 through 36.

EXAMPLES 30–36

SEARCH FOR OTHER CURE ACCELERATORS

In these examples, a polythioether was prepared as described hereinabove and characterized by the formula shown wherein the 1,2,4-substituted cyclohexane radical is present at about 0.5 mole percent of the total moles of R, $n$ is about 1, $m$ is about 21, R is a mixture of about 10 mole percent of propylene and about 90 mole percent of trimethylene, and the molecular weight is about 3300. The formulations tested were prepared from 100 parts of Resin Paste, 6.26 Parts of Catalyst Paste Both Pastes Prepared, as in Example 9–17, 0.40 Parts TETD, 0.40 Parts of Gamma-mercaptopropyltrimethoxysilane and the Following Parts of Accelerator Candidates.

| Additive | Example | | | | | | |
|---|---|---|---|---|---|---|---|
| | 30 | 31 | 32 | 33 | 34 | 35 | 36 |
| Diphenyl Guandine | 0.4 | | | | | | |
| tri(dimethylamino)phenol | | 0.4 | 0.4 | 0.04 | 0.4 | 0.4 | 0.4 |
| para-quinone dioxime | | 0.4 | | | | | |
| ZnO₂ Paste (55%) | | | 0.67 | | | | |
| CaO₂ Paste (62%) | | | | 0.67 | | | |
| PbO₂ Paste (50%) | | | | | 0.67 | | |
| m-Dinitrobenzene | | | | | | 1.67 | |
| Chloranil | | | | | | | 1.67 |
| Work Life (minutes) | 45 | 40 | 60 | 60 | >60 | 75 | 45 |
| Cure (40° C–60% RH) | skinned, soft | good | skinned, soft | slightly tacky | none | slightly tacky | slightly tacky |
| Days to Adhesion Failure | 3 | 30 | 3 | 2 | 1 | 1 | — |

In Examples 37 through 44 the effect of the level of catalyst paste is illustrated. In Examples 45 through 49, utilizing an optimum catalyst paste level, concentrations of tri(dimethylaminophenol), tetraethylthiuram disulfide and p-quinone dioxme were found which gave good performing sealants. In similar experiments, not shown here, it was found that tetramethylthiuram disulfide could be effectively substituted for tetraethylthiuram disulfide in the sealant systems of the present invention.

EXAMPLES 37–44

EFFECT OF CATALYST, TRI(DIMETHYLAMINOPHENOL), TETD and PARA-QUINONE DIOXIME CONCENTRATIONS In these examples a polythioether similar to that of Example 18–41 was employed. The formulations were prepared from 100 Parts of Resin Paste prepared with benzylphthalate (as in Examples 24–29) and the Following Parts of Catalyst Paste (Prepared with benzylphthalate) as in Examples 24–29 and Other Additives.

| Additive | 37 | 38 | 39 | Example 40 | 41 | 42 | 43 | 44 |
|---|---|---|---|---|---|---|---|---|
| MnO$_2$ Paste | 6.67 | 8.33 | 10 | 10 | 10 | 10 | 10 | 10 |
| Gamma-mercaptopropyltrimethoxysilane | .4 | .4 | .4 | .4 | .4 | .4 | .4 | .4 |
| tri(dimethylamino)phenol | .06 | .06 | .06 | .2 | .2 | .4 | .4 | .2 |
| Tetraethylthiuram disulfide (TETD) | .06 | .06 | .06 | .2 | .4 | .2 | .4 | .2 |
| p-Quinone dioxime | .06 | .06 | .06 | .4 | .2 | .2 | .4 | .2 |
| H$_2$O | — | — | — | — | — | — | — | .2 |
| Work Life (minutes) | 90 | 90 | 90 | 90 | 20 | 15 | 9 | 30 |
| Cure - 40° C, 60% RH | skinned soft | sl tack soft | tack-free soft | tack-free | good | good | good | good |
| Days to Adhesion Failure in 60° C water under UV | 9 | 12 | 17 | | | | | |

EXAMPLES 45 through 49

EFFECT OF ADDITIVE LEVELS OF SEALANT PERFORMANCES

Employing the same polythioether as in Examples 18–41 and 49–56, these formulations were prepared from 100 Parts of Resin paste and 10 Parts of Catalyst paste - Both Pastes Prepared with benzylphthalate, (as in Examples 24–29) and the Following Parts of Additives.

| Additive | 45 | 46 | Example 47 | 48 | 49 |
|---|---|---|---|---|---|
| Gamma-mercaptopropyltri-methoxysilane | .4 | .4 | .80 | .80 | .80 |
| Tri(dimethylamino)phenol | .20 | .2 | .2 | .2 | .07 |
| Tetraethylthiuram disulfide | .27 | .33 | .2 | .33 | .07 |
| Para-quinone dioxime | .20 | .2 | .2 | .2 | .2 |
| Work Life (minutes) | 20 | 20 | 37 | 30 | 50 |
| Cure, 40° C at 60% RH | good | good | good | good | good |
| Days to Adhesion Failure in 60° C water under UV | | | 9 | 23 | 11 |

In a similar manner a polythioether sealant composition containing lead peroxide as a curing agent was invented. These novel compositions are described in the Examples 50 and 51. This composition is useful as a building sealant.

A resin paste and catalyst pastes of the following compositions were prepared and utilized in Examples 50 and 51.

POLYTHIOETHER MASTERBATCHES FOR EXAMPLES 50-51

| Parts | Component |
|---|---|
| | Resin Paste |
| 100 | Polythioether (as in Examples 42–48) |
| 25 | Precipitated clacium carbonate |
| 20 | Ground calcium carbonate |
| 10 | Titanium dioxide |
| 25 | Chlorinated methyl-stearate |
| | Catalyst Paste I |
| 100 | Lead Peroxide |
| 100 | Benzylphthalate Plasticizer |
| | Catalyst Paste II |
| 100 | Lead Peroxide |
| 90 | Dibutylphthalate |
| 10 | Stearic acid |

EXAMPLES 50 and 51

POLYTHIOETHER BASED SEALANTS — PbO$_2$ CURE

EXAMPLES 50 and 51
POLYTHIOETHER BASED SEALANTS - PbO$_2$ CURE

| Component | Example 50 | 51 |
|---|---|---|
| Resin Paste | 100 | 100 |
| Catalyst Paste I | — | — |
| Catalyst Paste II | 6.25 | 6.25 |
| Tetraethylthiuram disulfide | 0.21 | — |
| Gamma-glycidoxypropyltrimethoxysilane | 1.67 | 1.67 |
| Work Life (minutes) | 270 | 270 |
| Cure Time (hours) | 96 | 96 |
| Adhesion Peel[1] | | |
| Aluminum | 35 | 15 |
| Glass | 25–35 | 15 |

[1]pounds per inch - cohesive failure after immersion in water at about 25° C for one week. Based on procedure of Interim Federal Specification No. TTS-00227E (COM-NBS), National Bureau of Standards.

Example 50 illustrates the formulation of a sealant, well-suited for use as an architectural sealant, based on polythioether derived from 1,2,4-trivinyl cyclohexane and utilizing PbO$_2$ as a oxidative curing agent. In Example 51, the substantially lower peel strength results from a lowering of the strength of the cured composition due to the lack of suitable cure accelerator such as the tetraethylthiuram disulfide employed in Example 50.

Further experimentation with polythioethers, in both MnO$_2$ and PbO$_2$ cured systems indicated that, although para quinone dioxime is an effective cure accelerator in the present sealant systems based on MnO$_2$, especially in admixture with tetraethylthiruam disculfide, and/or tetramethylthiuram disulfide, and/or tri(dimethylamino)phenol, it provides little or no advantage in similar systems based on PbO$_2$. Thus, in the sealant systems of the present invention, when PbO$_2$ is employed as the oxidative curing agent, it is preferred to utilize a cure accelerator selected from the group tetraethylthiuram disulfide, tetramethylthiuram disulfide, tri(dimethylamino(phenol and mixtures thereof. Furthermore, in the selection of an adhesion additive, it is preferred, though not essential, to employ gamma-mercaptopropyl-trimethoxysilane in the sealant system based on MnO₂ and gamma-glycidoxypropyltrimethoxysilane in those sealant systems based on PbO₂. In addition, it has been found that a minor amount of stearic acid may be effectively included in systems based on PbO₂ when it is desirable to prolong work life of the system, after mixing. For such purposes from about 0.1 to about 1.5 parts of stearic acid may be employed without adverse effects on other properties of the system.

As will be apparent from the foregoing examples, the specific properties of the elastomeric sealants of the present invention may be varied somewhat, depending on the specific use intended. For example, in the manufacture of thermally insulating windows where the sealant is used to seal two spaced panes of glass, the window units are commonly assembled in a factory where oven cures are practical. For such purposes, a sealant having for example a relatively short work life, such as 30 minutes and a cure time of about 4 hours in a 40° oven is desirable. The sealant based on manganese dioxide curing agent of Examples 45–48 are examples of suitable sealants for such a purpose. On the other hand, architectural sealants, for use in sealing joints in buildings, expansion joints and the like are used in the field and applied and cured under ambient conditions. For such purposes, a longer work life such as 4 hours or more is often required and the requirement of cure time is not as stringent. Cure times measured in days or even weeks may be satisfactory. Sealants based on lead dioxide curing agent such as that of Example 50 are well-suited for such purpose.

Repetition of the above Examples 1–51 using in place of the 1,2,4-trivinyl cyclohexane-derived polythioether either a comparable 1,2,3-trivinyl cyclohexane-derived polythioether (of the type illustrated in Example B) or a comparable 1,3,5-trivinyl cyclohexane-derived polythioether (of the type illustrated in Example C) provides results substantially similar to those obtained in the aforementioned numerical Examples.

I claim:

1. A sealant system comprising as a first component a mercaptan-terminated polythioether of the formula HS[(RS)$_n$R'S]$_m$(RS)$_n$H where R is propylene or trimethylene or mixtures thereof, R¹ is propylene or a mixture of propylene and a substituted cyclohexane radical of the formula

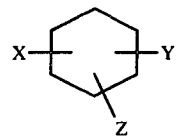

wherein X, Y and Z are substituents attached to different carbon atoms of the cyclohexane ring and two of X, Y and Z are —CH₂CH₂— and one of X, Y and Z is —CH₂CH₂(SR)$_n$[$_{SR}$¹(SR)$_n$]$_m$SH, said substituted cyclohexane radical being present at about 0.1 to about 3 mole percent of the total moles of R, n is 1 to about 10 and m is 1 to about 200; a filler; a plasticizer selected from the group consisting of chlorinated methylstearate; a phthalate ester and mixtures thereof; an adhesion additive selected from gamma-mercaptopropyl-trimethoxysilane and gamma-glycidoxypropyltrimethoxysilane; and a cure accelerator selected from the group consisting of tetraethylthiuram disulfide, tetramethylthiuram disulfide, para quinone dioxime, and tri(dimethylamino)phenol and mixtures thereof, and as a second component, an oxidative curing agent selected from manganese dioxide and lead dioxide.

2. A sealant system according to claim 1 wherein the substituted cyclohexane radical is

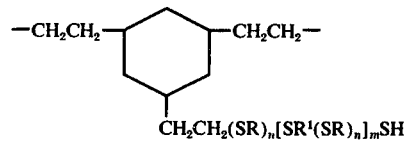

3. A sealant system according to claim 1 wherein the substituted cyclohexane radical is

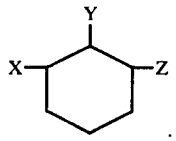

4. A sealant system according to claim 1 wherein the substituted cyclohexane radical is

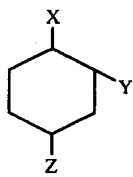

5. A sealant system according to claim 4 wherein said first and second components are combined.

6. A sealant system according to claim 5 when cured to an elastomeric composition.

7. A sealant system according to claim 4 wherein the mercaptan-terminated polythioether is characterized by a value of n of from about 1 to about 3 and a value of m of from about 15 to about 40 and the filler is calcium carboante.

8. A sealant system according to claim 7 wherein the second component comprises maganese dioxide, and the adhesion additive is gamma-mercaptopropyltrimethoxysilane.

9. A sealant system according to claim 8 comprising as the first component, 100 parts of said mercaptan-terminated polythioether 60–160 parts of calcium carbonate filler, 5 to 15 parts of titanium dioxide filler, 40 to 70 parts of the plasticizer, 0.1 to 3 parts of gamma-mercaptopropyltrimethoxysilane as adhesion additive, 0.1 to 2 parts of cure accelerator, and as said second component 5 to 12 parts of manganese dioxide.

10. A sealant system according to claim 9 wherein said first and second components are combined and cured to an elastomeric composition.

11. A sealant system according to claim 9 wherein said cure accelerator consists essentially of a mixture of 0.1 to 2 parts of tetraethylthiuram disulfide and 0.1 to 2 parts of tri(dimethylamino)phenol.

12. A sealant system according to claim 11 wherein said second component comprises 5 to 12 parts of manganese dioxide; 4 to 12 parts of the plasticizer and 0 to 10 parts of calcium carbonte.

13. A sealant system according to claim 12 wherein said first and second components are combined and cured to an elastomeric composition.

14. A sealant system according to claim 7 wherein the second component comprises lead dioxide, the adhesion additive is gamma-glycidoxypropyltrimethoxysilane 15. A system according to claim 13 comprising as the first component, 100 parts of said mercaptan-terminated polythioether, 60 to 160 parts of calcium carbonate filler, 5 to 15 parts of titanium dioxide filler, 40 to 70 parts of the plasticizer, 0.1 to 3 parts of gamma-glycidoxypropyltrimethoxysilane as adhesion additive, and 0.1 to 2 parts of a cure accelerator selected from the group consisting of tetramethylthiuram disulfide, tetraethylthiuram disulfide, and tri(dimethylamino)phenol, and mixtures thereof, and as the second component, 5 to 12 parts of lead dioxide.

16. A sealant system according to claim 15 wherein said second component comprises 5 to 12 parts of lead dioxide, 4 to 12 parts of the plasticizer and 0 to 10 parts of calcium carbonate.

17. A sealant system according to claim 16 wherein said second component contains 0.1 to 1.5 parts of stearic acid.

18. A sealant system according to claim 17 wherein said first and second components are combined and cured to an elastomeric composition.

* * * * *